United States Patent
Sung et al.

(10) Patent No.: US 11,349,177 B2
(45) Date of Patent: May 31, 2022

(54) SEPARATOR INCLUDING SEPARATOR SUBSTRATE WITH COATING LAYER INCLUDING CARBOXYMETHYL CELLULOSE, PARTICLE-TYPE BINDER, AND DISSOLUTION-TYPE BINDER

(71) Applicant: LG CHEM, LTD., Seoul (KR)

(72) Inventors: In Hyouk Sung, Daejeon (KR); Su Jin Yoon, Daejeon (KR); Sang Joon Lee, Daejeon (KR); Hye Jin Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 201 days.

(21) Appl. No.: 16/612,164

(22) PCT Filed: Dec. 21, 2018

(86) PCT No.: PCT/KR2018/016485
§ 371 (c)(1),
(2) Date: Nov. 8, 2019

(87) PCT Pub. No.: WO2019/135527
PCT Pub. Date: Jul. 11, 2019

(65) Prior Publication Data
US 2021/0135316 A1 May 6, 2021

(30) Foreign Application Priority Data
Jan. 5, 2018 (KR) .......................... 10-2018-0001915

(51) Int. Cl.
*H01M 50/451* (2021.01)
*H01M 50/417* (2021.01)
(Continued)

(52) U.S. Cl.
CPC ...... *H01M 50/451* (2021.01); *H01M 10/0525* (2013.01); *H01M 50/417* (2021.01); *H01M 50/434* (2021.01)

(58) Field of Classification Search
CPC . H01M 50/451; H01M 50/417; H01M 50/434
(Continued)

(56) References Cited

U.S. PATENT DOCUMENTS 8,426,053 B2    4/2013   Lee et al.
9,166,250 B2   10/2015   Katayama et al.
(Continued)

FOREIGN PATENT DOCUMENTS

CN    103515564 A  *  1/2014
CN    104157818 A    11/2014
(Continued)

OTHER PUBLICATIONS

Extended European Search Report, dated Apr. 2, 2020, for European Application No. 18898062.7.
(Continued)

*Primary Examiner* — Sean P Cullen
(74) *Attorney, Agent, or Firm* — Birch, Stewart, Kolasch & Birch, LLP

(57) ABSTRACT

A separator for secondary batteries, including: a separator substrate having at least one surface, wherein the separator substrate includes a polyolefin-based polymer resin having a porous structure and a coating layer is applied to one surface or opposite surfaces of a separator substrate made of a polyolefin-based polymer resin having a porous structure, wherein the coating layer includes a thickener, a filler, a particle-type binder, and a dissolution-type binder, wherein the thickener comprises carboxymethyl cellulose, and wherein an amount of the particle-type binder is greater than an amount of the dissolution-type binder.

10 Claims, 2 Drawing Sheets

(51) Int. Cl.
*H01M 50/434* (2021.01)
*H01M 10/0525* (2010.01)

(58) Field of Classification Search
USPC .................................. 429/144, 251, 252, 254
See application file for complete search history.

(56) References Cited

U.S. PATENT DOCUMENTS

| | | | |
|---|---|---|---|
| 9,711,772 | B2 | 7/2017 | Yoo et al. |
| 10,158,111 | B2 | 12/2018 | Lee et al. |
| 10,333,126 | B2 | 6/2019 | Joo et al. |
| 2011/0003209 | A1 | 1/2011 | Katayama et al. |
| 2012/0015254 | A1 | 1/2012 | Lee et al. |
| 2014/0147726 | A1* | 5/2014 | Toyoda ............. C08F 220/12 429/144 |
| 2014/0322587 | A1 | 10/2014 | Lai et al. |
| 2015/0140404 | A1 | 5/2015 | Yoo et al. |
| 2016/0181618 | A1* | 6/2016 | Hoshiba ............ H01M 10/0525 429/94 |
| 2016/0204406 | A1* | 7/2016 | Ryu .................. H01M 50/449 429/144 |
| 2016/0226051 | A1 | 8/2016 | Lee et al. |
| 2018/0097216 | A1 | 4/2018 | Joo et al. |
| 2018/0114966 | A1 | 4/2018 | Yasuda et al. |
| 2018/0114968 | A1 | 4/2018 | Joo et al. |
| 2019/0081306 | A1 | 3/2019 | Lee et al. |

FOREIGN PATENT DOCUMENTS

| | | | | |
|---|---|---|---|---|
| CN | 104272501 A | | 1/2015 | |
| CN | 104332578 A | * | 2/2015 | |
| CN | 105098121 A | * | 11/2015 | |
| CN | 107431171 A | | 12/2017 | |
| KR | 10-2011-0002889 A | | 1/2011 | |
| KR | 10-2011-0057079 A | | 5/2011 | |
| KR | 10-1341196 B1 | | 12/2013 | |
| KR | 10-2015-0068711 A | | 6/2015 | |
| KR | 10-2015-0106818 A | | 9/2015 | |
| KR | 10-2015-0114276 A | | 10/2015 | |
| KR | 10-2016-0069386 A | | 6/2016 | |
| KR | 10-2016-0118966 A | | 10/2016 | |
| WO | WO 2014/092334 A1 | | 6/2014 | |
| WO | WO-2016034019 A1 | * | 3/2016 | .......... H01M 50/409 |
| WO | WO-2016034020 A1 | * | 3/2016 | .......... H01M 50/409 |
| WO | WO 2016/157899 A1 | | 10/2016 | |

OTHER PUBLICATIONS

International Search Report for PCT/KR2018/016485 dated Apr. 10, 2019.

* cited by examiner

SEPARATOR INCLUDING SEPARATOR SUBSTRATE WITH COATING LAYER INCLUDING CARBOXYMETHYL CELLULOSE, PARTICLE-TYPE BINDER, AND DISSOLUTION-TYPE BINDER

TECHNICAL FIELD

This application claims the benefit of the priority to Korean Patent Application No. 2018-0001915 filed on Jan. 5, 2018, the disclosure of which is herein incorporated by reference in its entirety.

The present invention relates to a separator including carboxymethyl cellulose (CMC), a particle-type binder, and a dissolution-type binder, and more particularly to a separator for secondary batteries configured such that a coating layer, formed on one surface or opposite surfaces of a separator substrate, includes CMC, serving as a thickener, a filler, a particle-type binder, and a dissolution-type binder, and such that the content of the particle-type binder is greater than the content of the dissolution-type binder.

BACKGROUND ART

With the development of information technology (IT), interest has been taken in portable devices, such as portable computers, portable telephones, and cameras, and as the demand for such portable devices increases, a variety of research has been conducted on secondary batteries as energy sources for the portable devices.

In particular, among the secondary batteries, a lithium secondary battery, which has high energy density, a long lifespan, and a low self-discharge rate, has come to be widely used.

In addition, as increasing attention is being paid to environmental problems, much research has been conducted on electric vehicles and hybrid electric vehicles, which are capable of replacing vehicles using fossil fuels, such as gasoline vehicles and diesel vehicles, which are one of the principal causes of air pollution, and the lithium secondary battery has come to used as a power source for such electric vehicles or hybrid electric vehicles.

However, the lithium secondary battery has a shortcoming in that there is a safety-related problem, in which the lithium secondary battery catches fire or explodes due to an organic electrolytic solution used in the lithium secondary battery.

The lithium secondary battery is manufactured by coating a positive electrode mixture including a positive electrode active material and a negative electrode mixture including a negative electrode active material on a positive electrode current collector and a negative electrode current collector, respectively, to manufacture a positive electrode and a negative electrode, interposing a separator between the positive electrode and the negative electrode, and injecting an electrolytic solution.

The separator, which is configured to guarantee insulation between the positive electrode and the negative electrode, serves as a path via which lithium ions move between the positive electrode and the negative electrode during charging and discharging of the battery. In general, the separator has a structure in which a coating layer configured to improve the physical properties of the separator is applied onto a separator substrate.

The separator may be classified as an aqueous coating separator or a non-aqueous coating separator depending on the composition of the coating layer. In the aqueous separator, the force of binding between the separator substrate and the coating layer at the interface therebetween is low, whereby the coating layer may be easily separated from the separator substrate. In addition, at the time of slitting, foreign matter, such as dust, may be generated. The foreign matter may deteriorate the external appearance of the battery.

In the case in which the content of a binder included in the coating layer is increased in order to increase the peel strength of the coating layer from the separator substrate, however, the resistance of the separator increases, and the venting time also increases. For this reason, it is not an appropriate solution to increase the content of the binder.

In connection therewith, Patent Document 1 discloses a method of coating an aqueous slurry, including inorganic particles, a binder polymer, and an aqueous medium, on a polyolefin-based porous polymer film substrate in order to manufacture a separator. It is specified that the aqueous slurry has a capillary number, which is calculated based on viscosity, coating speed, and surface tension, of 0.3 to 0.65.

Patent Document 1 discloses an aqueous slurry including carboxymethyl cellulose, serving as a thickener. However, it is described merely that the aqueous slurry has a capillary number within a specific range, and the aqueous slurry is manufactured using only one kind of binder.

Patent Document 2 discloses a composite separator including a porous substrate layer, a heat-resistant layer formed on one surface or opposite surfaces of the porous substrate layer, and a fusion layer formed on the outermost layer of the separator, wherein the heat-resistant layer is configured such that inorganic particles are connected and fixed by a binder polymer, and wherein the fusion layer includes a particle-type crystalline polymer having a melting temperature of 100° C.

However, Patent Document 2 discloses only the effect depending on the presence or absence of the heat-resistant layer and the fusion layer and the effect depending on the kind of the inorganic particles, and does not suggest technology for increasing the peel strength of the separator or reducing the resistance of the separator.

Patent Document 3 discloses an organic/inorganic composite coating porous separator formed by coating a slurry, manufactured by dispersing two or three kinds of binders and inorganic particles in water, on a separator substrate, wherein a separator coating layer includes CMC, but does not suggest technology for increasing the peel strength of the separator while reducing the amount of the binders that are used.

In the case in which the aqueous separator is used, therefore, there is urgent necessity for technology that is capable of preventing the resistance of the separator from increasing due to an increase in the content of the binder and of increasing peel strength between the separator coating layer and the separator substrate.

PRIOR ART DOCUMENT (Patent Document 1) Korean Patent Application Publication No. 2015-0114276
(Patent Document 2) Korean Patent Application Publication No. 2016-0118966
(Patent Document 3) Korean Registered Patent Publication No. 1341196

DISCLOSURE

Technical Problem

The present invention has been made in view of the above problems, and it is an object of the present invention to provide a separator for secondary batteries configured such that the separator is an aqueous separator including a separator substrate and a coating layer, such that the coating layer includes carboxymethyl cellulose (CMC), serving as a thickener, a filler, a particle-type binder, and a dissolution-type binder, and such that, in the case in which the content of the particle-type binder is greater than the content of the dissolution-type binder, the content of CMC, the content of the particle-type binder, and the content of the dissolution-type binder are limited to within predetermined ranges, whereby the peel strength of the separator is increased while the resistance of the separator is low.

Technical Solution

In accordance with an aspect of the present invention, the above and other objects can be accomplished by the provision of a separator for secondary batteries, comprising: a separator substrate having at least one surface, wherein the separator substrate comprises a polyolefin-based polymer resin having a porous structure; and a coating layer applied to one surface or opposite surfaces of the separator substrate, wherein the coating layer including a thickener, a filler, a particle-type binder, and a dissolution-type binder, wherein the thickener comprises carboxymethyl cellulose, and wherein an amount of the particle-type binder is greater than an amount of the dissolution-type binder.

The separator according to the present invention is manufactured by forming a coating layer on a separator substrate made of a polyolefin-based polymer resin using a thickener, a filler, a particle-type binder, and a dissolution-type binder.

In the separator, the separator substrate itself is configured to have a pore structure, and interstitial volumes are formed between filler particles, which are a component of the coating layer. The coating layer includes a uniform pore structure.

Also, in the case in which a polymer capable of gelling when the particle-type binder or the dissolution-type binder is impregnated with a liquid electrolytic solution is used therewith, the polymer may also be used as an electrolyte.

In the separator, a plurality of uniform pore structures is formed both in the coating layer and in the separator substrate made of the polyolefin-based polymer resin. Lithium ions smoothly move through the pores, and the pores are filled with a large amount of electrolytic solution, whereby a high impregnation rate is achieved and thus the performance of the battery is also improved.

For example, the material for the separator substrate may be at least one selected from the group consisting of high-density polyethylene, low-density polyethylene, linear low-density polyethylene, ultrahigh-molecular-weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylenesulfidro, polyethylene naphthalene, and a mixture thereof.

The particle-type binder exhibits a property in which the inherent particle form of the particle-type binder is not changed but is maintained even in the case in which the particle-type binder is dispersed in a solvent. For example, the particle-type binder may be a polyvinylidene fluoride-based (PVdF)-based or acrylic-based polymer. The dissolution-type binder is capable of being dissolved in a polar solvent. For example, the dissolution-type binder may be polyvinyl alcohol (PVA), polyvinylpyrrolidone (PVP), or polyacrylamide (PAM).

The filler serves not only to form micropores in spaces between the filler particles but also as a kind of spacer that is capable of maintaining the physical shape of the coating layer. In addition, the physical characteristics of the filler are not generally changed even at a high temperature of 200° C. or higher, whereby the coating layer exhibits high heat resistance.

That is, the filler may be a heat-resistant filler selected from silica, boehmite, or alumina.

The amount of CMC may be 1 wt % to 10 wt %, preferably 2 wt % to 8 wt %, based on a weight of the filler.

In the case in which the content of CMC is less than 1 wt % of the weight of the filler, the peel strength of the separator is reduced, which is undesirable. In the case in which the content of CMC is greater than 10 wt % of the weight of the filler, the viscosity of the coating layer slurry is excessively high, whereby it is difficult to secure the physical properties of the separator, which is also undesirable.

An amount of a total of the particle-type binder and the dissolution-type binder may be 1 wt % to 10 wt %, preferably 2 wt % to 8 wt %, based on a weight of the filler.

In the case in which an amount of the total of the particle-type binder and the dissolution-type binder is less than 1 wt % of the weight of the filler, the force of adhesion to an electrode may be reduced, which is undesirable. In the case in which an amount of the total of the particle-type binder and the dissolution-type binder is greater than 10 wt % of the weight of the filler, the pores in the separator substrate may be clogged, since the amount of the binder is high, whereby resistance may increase, which is also undesirable.

The mixing ratio of the particle-type binder to the dissolution-type binder may be 6:4 to 9:1, preferably 6:4 to 8:2.

On the assumption that the sum of the particle-type binder and the dissolution-type binder is 10, in the case in which the particle-type binder's share is less than 6, the peel strength of the separator is remarkably reduced, which is undesirable, and in the case in which the particle-type binder's share is greater than 9, the resistance of the separator remarkably increases, which is also undesirable.

In the case in which the content of CMC and the mixing ratio of the particle-type binder to the dissolution-type binder are adjusted, as described above, it is possible to provide a separator having remarkably improved physical properties. The peel strength of the separator may range from 40 gf/15 mm to 80 gf/15 mm, and the resistance of the separator may range from 0.5Ω to 0.7Ω.

When the coating layer slurry is manufactured in order to manufacture the coating layer of the separator, the coating layer slurry may be dispersed in water. Since water is used instead of an organic solvent, it is possible to reduce costs and furthermore to prevent environmental pollution.

In accordance with another aspect of the present invention, there are provided an electrode assembly including the separator for secondary batteries, a positive electrode, and a negative electrode, and a secondary battery having the electrode assembly received in a battery case together with a non-aqueous electrolytic solution.

The positive electrode may be manufactured by applying a mixture of a positive electrode active material, a conductive agent, and a binder to a positive electrode current collector, and drying and pressing the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The conductive agent is generally added so that the conductive agent accounts for 1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers may be used.

The filler is an optional component used to inhibit expansion of the positive electrode. There is no particular limit to the filler, as long as it does not cause chemical changes in a battery to which the filler is applied and is made of a fibrous material. As examples of the filler, olefin polymers, such as polyethylene and polypropylene; and fibrous materials, such as glass fiber and carbon fiber may be used.

Meanwhile, the negative electrode may be manufactured by applying a negative electrode active material to a negative electrode current collector, and drying and pressing the same. The above-described conductive agent, binder, and filler may be selectively further included as needed.

In general, the negative electrode current collector is manufactured so as to have a thickness of 3 to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or may be made of an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); a lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a lithium secondary battery having the electrode assembly received in a battery case together with a non-aqueous electrolytic solution.

The non-aqueous electrolytic solution is composed of a non-aqueous electrolyte and lithium salt. A non-aqueous organic solvent, an organic solid electrolyte, or an inorganic solid electrolyte is used as the non-aqueous electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulfides of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, or the like may be added to the non-aqueous electrolyte. Depending on the circumstances, in order to impart incombustibility thereto, the non-aqueous electrolyte may further include halogen-containing solvents, such as carbon tetrachloride and ethylene trifluoride. Furthermore, in order to improve the high-temperature retention characteristics thereof, the non-aqueous electrolyte may further include carbon dioxide gas. Moreover, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of cyclic carbonate, such as EC or PC, which is a high-dielectric solvent, and linear carbonate, such as DEC, DMC, or EMC, which is a low-viscosity solvent, in order to manufacture a non-aqueous electrolyte containing lithium salt.

The battery case may be a pouch-shaped battery case made of a laminate sheet including an outer coating layer made of a weather-resistant polymer, an inner sealant layer made of a thermally fusible polymer, and a barrier layer interposed between the outer coating layer and the inner sealant layer. Specifically, the battery case may be a pouch-shaped battery case made of an aluminum laminate sheet including a barrier layer made of aluminum (Al).

In accordance with a further aspect of the present invention, there are provided a battery pack including the secondary battery as a unit cell and a device including the battery pack.

Specific examples of the device may include a small-sized device, such as a computer, a mobile phone, or a power tool, and a middle- or large-sized device, such as a power tool driven by a battery-powered motor; an electric automobile, including an electric vehicle (EV), a hybrid electric vehicle (HEV), or a plug-in hybrid electric vehicle (PHEV); an electric two-wheeled vehicle, including an electric bicycle (E-bike) or an electric scooter (E-scooter); an electric golf cart; and an energy storage system. However, the present invention is not limited thereto.

The structures of the battery pack and the device are well known in the art to which the present invention pertains, and thus a detailed description thereof will be omitted.

BEST MODE

Figure 1:
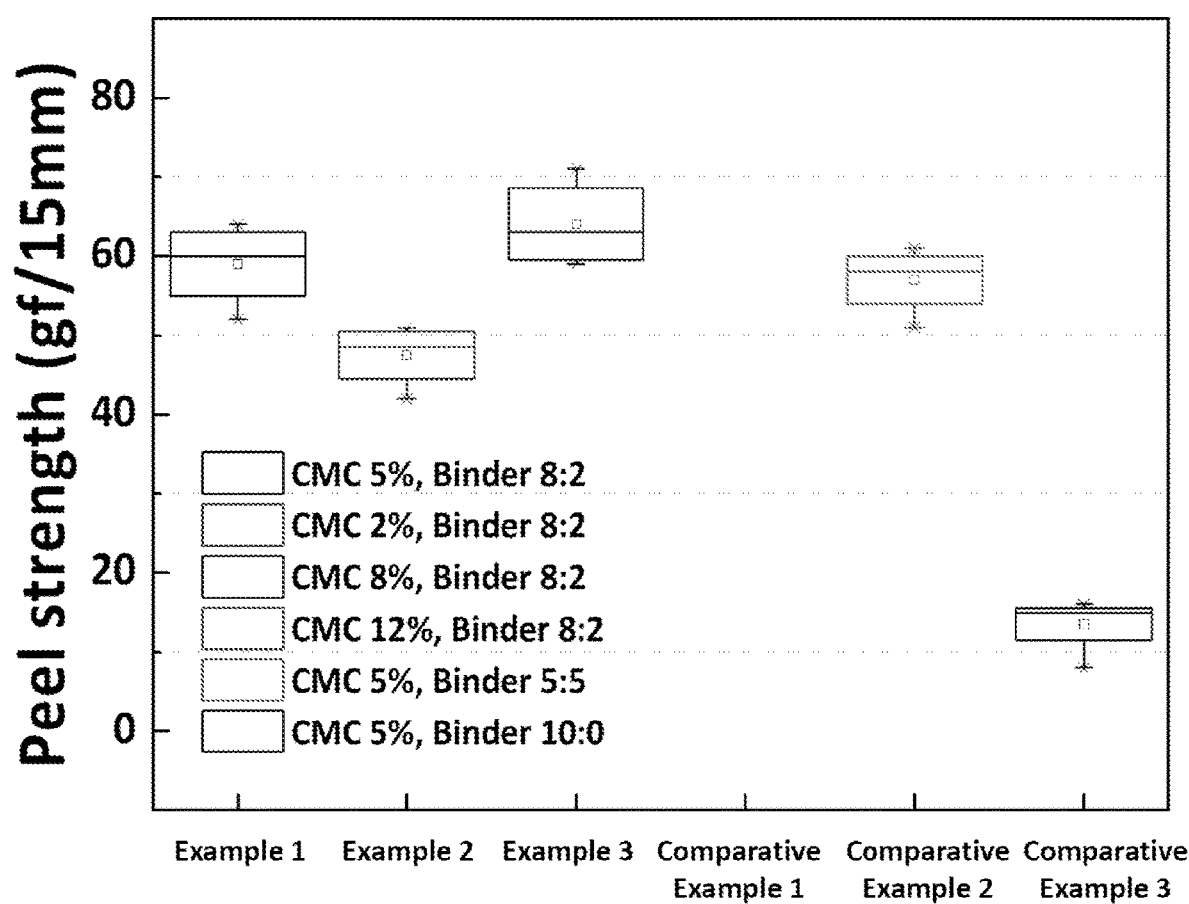
FIG. 1 is a graph showing the results of measurement of peel strength according to Experimental Example 1.

Hereinafter, the present invention will be described with reference to the following examples. These examples are provided only for easier understanding of the present invention and should not be construed as limiting the scope of the present invention.

Example 1

30 g of alumina, serving as a filler, and 1.5 g of CMC were dissolved and mixed in distilled water such that the content of CMC was 5 wt % of the weight of the filler, and the mixture was stirred for 2 hours such that the content of total solids in the mixture was about 30% in order to manufacture a primary slurry.

In order to manufacture a binder mixture, the content of which was 5 wt % of the weight of the filler, 1.2 g of polyvinyl pyrrolidone (PVP), serving as a dissolution-type binder, and 0.3 g of acrylate emulsion, serving as a water-borne particle-type binder, were mixed with each other at a ratio of 8:2, and then the mixture was mixed with the manufactured primary slurry.

The slurry was filtered once using a wire mesh, coated on one surface of a porous polyolefin-based separator substrate so as to have a thickness of 1.5 to 2.5 micrometers using a bar coater, and dried in order to manufacture an aqueous coating separator.

Example 2

An aqueous coating separator was manufactured using the same method as in Example 1, except that the content of CMC was changed from 1.5 g to 0.6 g.

Example 3

An aqueous coating separator was manufactured using the same method as in Example 1, except that the content of CMC was changed from 1.5 g to 2.4 g.

Comparative Example 1

An aqueous coating separator was manufactured using the same method as in Example 1, except that the content of CMC was changed from 1.5 g to 3.6 g.

Comparative Example 2

An aqueous coating separator was manufactured using the same method as in Example 1, except that the content of the particle-type binder was changed from 0.3 g to 0.75 g and the content of the dissolution-type binder was changed from 1.2 g to 0.75 g.

Comparative Example 3

An aqueous coating separator was manufactured using the same method as in Example 1, except that the content of the particle-type binder was changed from 0.3 g to 1.5 g and the dissolution-type binder was omitted.

Experimental Example 1

The peel strength, venting time, and resistance of each of the aqueous coating separators manufactured according to Examples 1 to 3 and Comparative Examples 1 to 3 were measured. The results of measurement are shown in Table 1 below and in FIGS. 1 and 2.

In order to measure the peel strength, a coating separator cut to 15 mm×100 mm was attached to a glass plate using an adhesive tape, and the peel strength of the coating separator was measured using a universal testing machine (UTM) based on a 180-degree peeling method according to ASTM D 3330.

TABLE 1

| | Example 1 | Example 2 | Example 3 | Comparative Example 1 | Comparative Example 2 | Comparative Example 3 |
|---|---|---|---|---|---|---|
| CMC (based on filler) | 5 wt % | 2 wt % | 8 wt % | 12 wt % | 5 wt % | 5 wt % |
| Particle type:Dissolution type | 8:2 | 8:2 | 8:2 | 8:2 | 5:5 | 10:0 |
| Peel strength (gf/15 mm) | 59 | 48 | 64 | — | 57 | 14 |
| Venting time (s/100 cc) | 152 | 146 | 158 | — | 165 | 147 |
| Resistance(Ω) | 0.58 | 0.52 | 0.61 | — | 0.76 | 0.49 |

Figure 2:
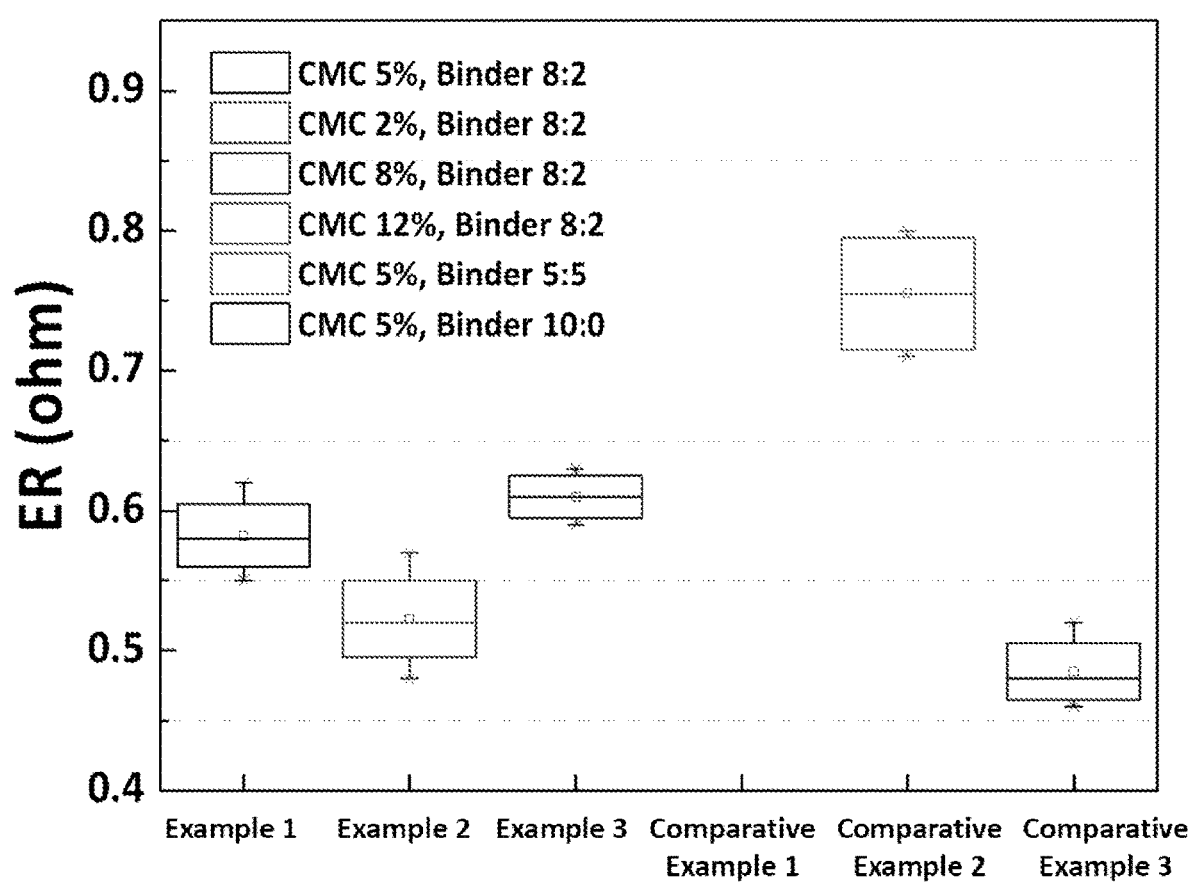
FIG. 2 is a graph showing the results of measurement of resistance according to Experimental Example 1.

Referring to Table 1 above and FIGS. 1 and 2, in the case of Comparative Example 1, in which the content of CMC was 12 wt % of the total weight of the filler, the viscosity of the separator was too high, whereby filtering was difficult and thus no experiment could be carried out.

Consequently, it can be seen that a coating layer slurry, in which the content of CMC was more than 10 wt % of the total weight of the filler, is not appropriate, since it is difficult to secure the physical properties of the slurry.

On the other hand, in the case of Examples 1 to 3 and Comparative Examples 2 and 3, in each of which the content of CMC was 2 to 8 wt % of the weight of the filler, experiments for measuring the physical properties of the separators could be carried out. Particularly, in the case of Examples 1 to 3, in which the particle-type binder and the dissolution-type binder were included in a content ratio of 8:2, it can be seen that the separators exhibited high peel strengths and had low resistance values. Meanwhile, it can be seen that the venting time of each of the separators manufactured according to Examples 1 to 3 was shorter than that of the separator manufactured according to Comparative Example 2 but similar to that of the separator manufactured according to Comparative Example 3.

In the case of Comparative Example 2, in which the content ratio of the particle-type binder to the dissolution-type binder was 5:5, the peel strength of the separator was relatively high, but the measured resistance value of the separator was the highest. In the case of Comparative Example 3, in which only the particle-type binder was included, the measured resistance value of the separator was low, but the measured peel strength of the separator was remarkably low.

Consequently, it can be seen that it is possible to obtain desired effects when the separator includes not only CMC within a specific numerical range but also the particle-type binder and the dissolution-type binder within a predetermined content ratio range.

Those skilled in the art to which the present invention pertains will appreciate that various applications and modifications are possible based on the above description without departing from the scope of the present invention.

INDUSTRIAL APPLICABILITY

As is apparent from the above description, in the case in which a separator for secondary batteries according to the present invention is configured such that the content of a binder included in a coating layer, which is coated on a separator substrate, is reduced, such that a thickener is included within a predetermined amount range, and such that a particle-type binder is included in a larger amount than a dissolution-type binder, the resistance of the separator is reduced or the venting time is increased, since the binder is included in a small amount, whereby it is possible to prevent the physical properties of the separator from being deteriorated.

In addition, since the peel strength of the coating layer from the separator substrate is increased, it is possible to solve a problem in which the physical properties of the separator are deteriorated due to the separation between the coating layer and the separator substrate.

The invention claimed is:

1. A separator for secondary batteries, comprising:
a separator substrate having at least one surface, wherein the separator substrate comprises a polyolefin-based polymer resin having a porous structure; and
a coating layer applied to one surface or opposite surfaces of the separator substrate,
wherein the coating layer comprises a thickener, a filler, a particle-type binder, and a dissolution-type binder, wherein the thickener comprises carboxymethyl cellulose, wherein the dissolution-type binder is polyvinylpyrrolidone,
wherein an amount of the particle-type binder is greater than an amount of the dissolution-type binder, and
wherein an amount of carboxymethyl cellulose is 5 wt % to 8 wt % based on a weight of the filler.

2. The separator for secondary batteries according to claim 1, wherein
the particle-type binder is a polyvinylidene fluoride-based or acrylic-based polymer.

3. The separator for secondary batteries according to claim 1, wherein an amount of a total of the particle-type binder and the dissolution-type binder is 1 wt % to 10 wt % based on the weight of the filler.

4. The separator for secondary batteries according to claim 1, wherein a mixing ratio of the particle-type binder to the dissolution-type binder is 6:4 to 9:1.

5. The separator for secondary batteries according to claim 1, wherein the filler is a heat-resistant filler selected from silica, boehmite, or alumina.

6. The separator for secondary batteries according to claim 1, wherein a peel strength of the separator is 40 gf/15 mm to 80 gf/15 mm.

7. The separator for secondary batteries according to claim 1, wherein a resistance of the separator is 0.5Ω to 0.7Ω.

8. The separator for secondary batteries according to claim 1, wherein the coating layer of the separator is an aqueous coating layer.

9. An electrode assembly comprising the separator for secondary batteries according to claim 1.

10. A secondary battery comprising the electrode assembly according to claim 9.

* * * * *